United States Patent
Choo et al.

(10) Patent No.: US 12,420,856 B2
(45) Date of Patent: Sep. 23, 2025

(54) VEHICLE STEERING WHEEL COMPRISING MECHANISMS AND A CONTROL ACTUATOR

(71) Applicant: Autoliv Development AB, Vargarda (SE)

(72) Inventors: Seung-Hoon Choo, Seoul (KR); Sebastien Cassin, Migné Auxances (FR); Thomas Leboeuf, Ouzilly (FR); Ho-Jun Sung, Seoul (KR)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 18/290,610

(22) PCT Filed: Jul. 22, 2022

(86) PCT No.: PCT/EP2022/070618
§ 371 (c)(1),
(2) Date: Jan. 19, 2024

(87) PCT Pub. No.: WO2023/002016
PCT Pub. Date: Jan. 26, 2023

(65) Prior Publication Data
US 2024/0336293 A1    Oct. 10, 2024

(30) Foreign Application Priority Data

Jul. 23, 2021 (FR) .................................. FR2108024

(51) Int. Cl.
*B62D 1/04* (2006.01)
*B62D 1/06* (2006.01)
(Continued)

(52) U.S. Cl.
CPC ................. *B62D 1/06* (2013.01); *B62D 1/10* (2013.01); *F16C 1/18* (2013.01)

(58) Field of Classification Search
CPC .. B62D 1/06; B62D 1/10; B62D 1/183; F16C 1/12; F16C 1/18; F16C 1/26
See application file for complete search history.

(56) References Cited

U.S. PATENT DOCUMENTS

| 1,427,829 A | * 9/1922 | Luckey ..................... F16C 1/26 74/502.5 |
|---|---|---|
| 11,214,294 B2 | 1/2022 | Kawaguchi |

(Continued)

FOREIGN PATENT DOCUMENTS

| CN | 113335365 A | * 9/2021 |
|---|---|---|
| CN | 114394149 A | * 4/2022 |

(Continued)

OTHER PUBLICATIONS

Machine translation of CN 113335365 A obtained on Nov. 20, 2024.*
Machine translation of EP 3050775 A1 obtained on Nov. 20, 2024.*

*Primary Examiner* — Adam D Rogers
(74) *Attorney, Agent, or Firm* — Matthew D. Thayne; Thayne and Davis LLC

(57) ABSTRACT

A vehicle steering wheel comprising: a base structure a mobile structure, articulated relative to the base structure so as to be able to move between a first position and a second position, a first mechanism and a second mechanism, each arranged between the base structure, an actuator arranged to generate a movement for driving the first mechanism and the second mechanism, a transmission device comprising at least one cable arranged to transmit the driving movement of the actuator to at least one of the first mechanism or the second mechanism.

16 Claims, 4 Drawing Sheets

(51) Int. Cl.
*B62D 1/10* (2006.01)
*F16C 1/12* (2006.01)
*F16C 1/18* (2006.01)

(56) References Cited

U.S. PATENT DOCUMENTS

| | | | |
|---|---|---|---|
| 11,230,315 B2* | 1/2022 | Kastelic | B62D 1/08 |
| 11,352,043 B2* | 6/2022 | Faßbender | B62D 1/10 |
| 11,919,561 B2* | 3/2024 | Leboeuf | B62D 1/10 |
| 12,083,972 B2* | 9/2024 | Barritault | B62D 1/04 |
| 12,122,444 B2* | 10/2024 | Klein | B62D 1/08 |
| 2020/0269900 A1 | 8/2020 | Kawaguchi | |
| 2024/0034388 A1* | 2/2024 | Barritault | B62D 1/06 |
| 2024/0140517 A1* | 5/2024 | Barritault | B62D 1/08 |
| 2024/0253689 A1* | 8/2024 | Sang | B62D 1/08 |

FOREIGN PATENT DOCUMENTS

| | | | |
|---|---|---|---|
| CN | 115366981 A * | 11/2022 | |
| DE | 102018111327 A1 | 11/2019 | |
| EP | 3050775 A1 * | 8/2016 | |
| WO | WO-2024104883 A1 * | 5/2024 | |

* cited by examiner

[Fig. 1]
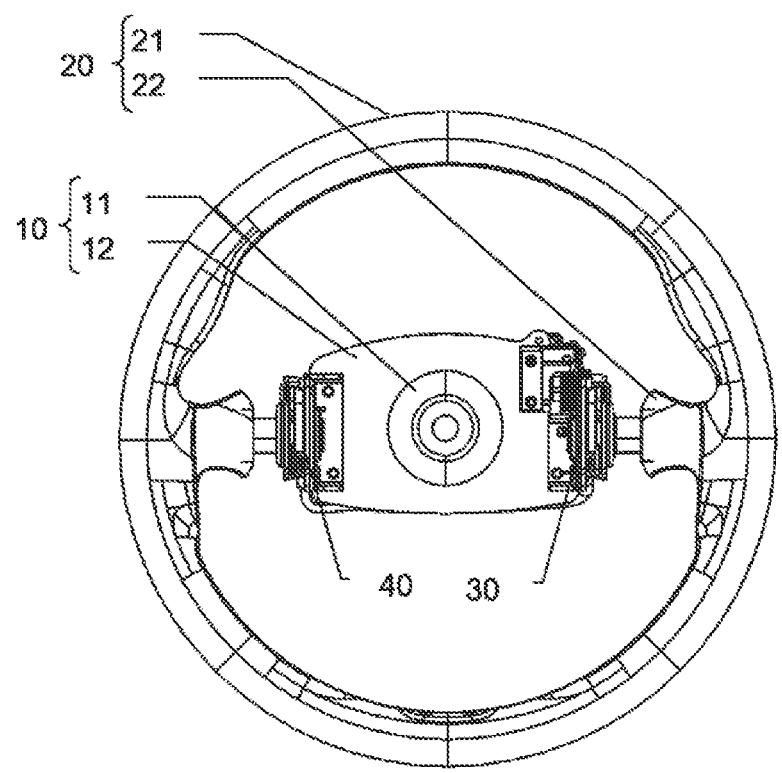
[Fig. 2]
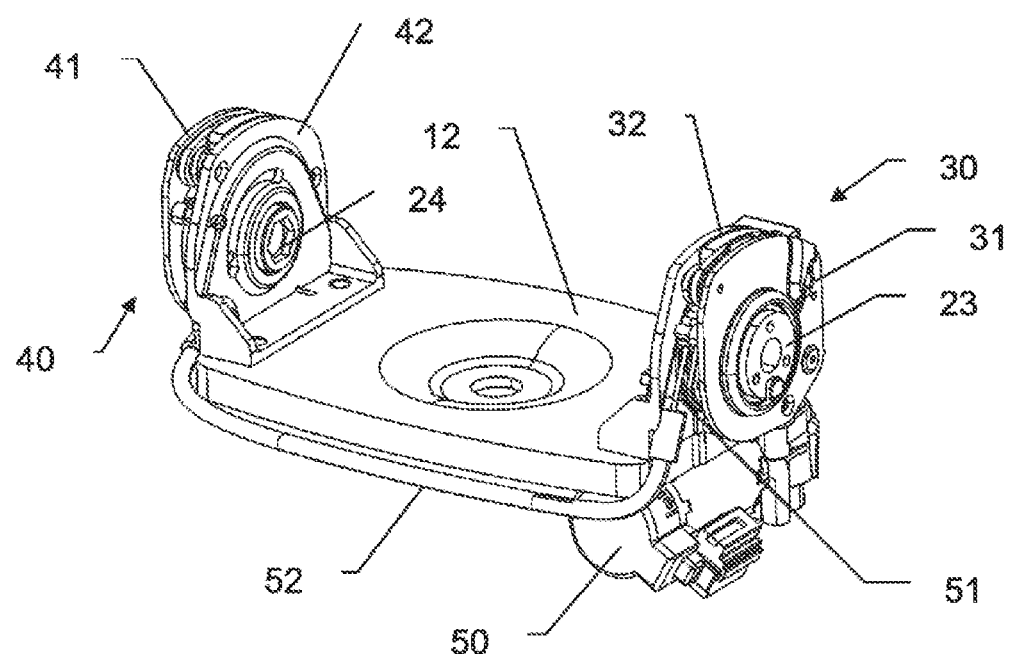

[Fig. 3]
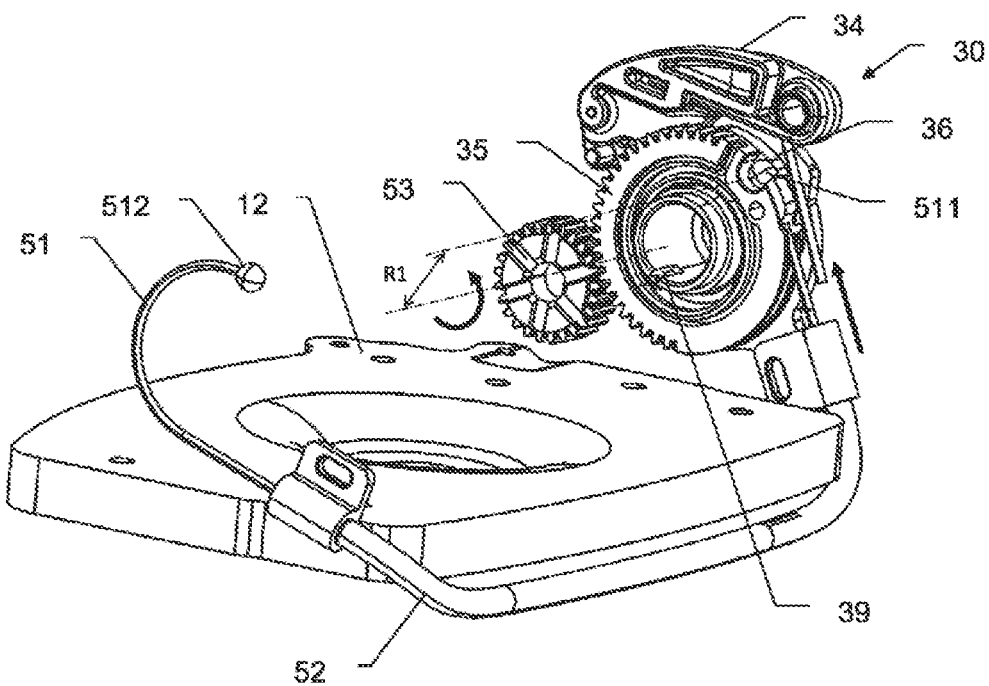
[Fig. 4]
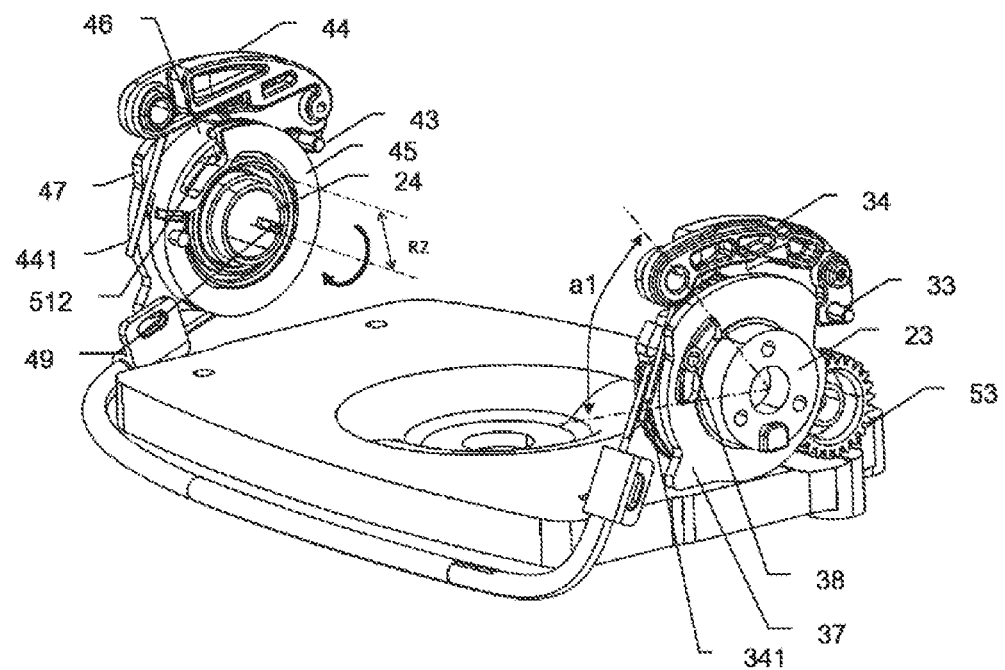

[Fig. 5]
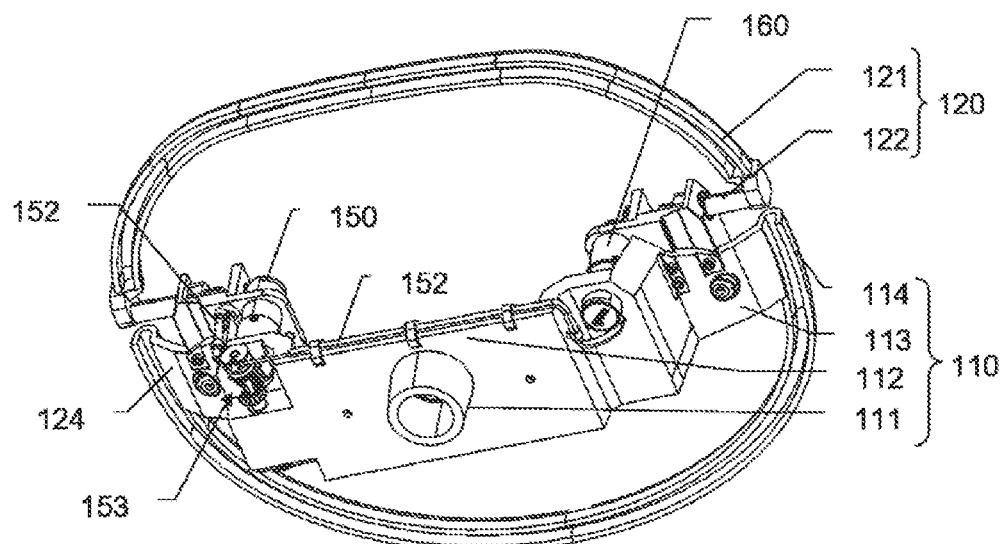
[Fig. 6]
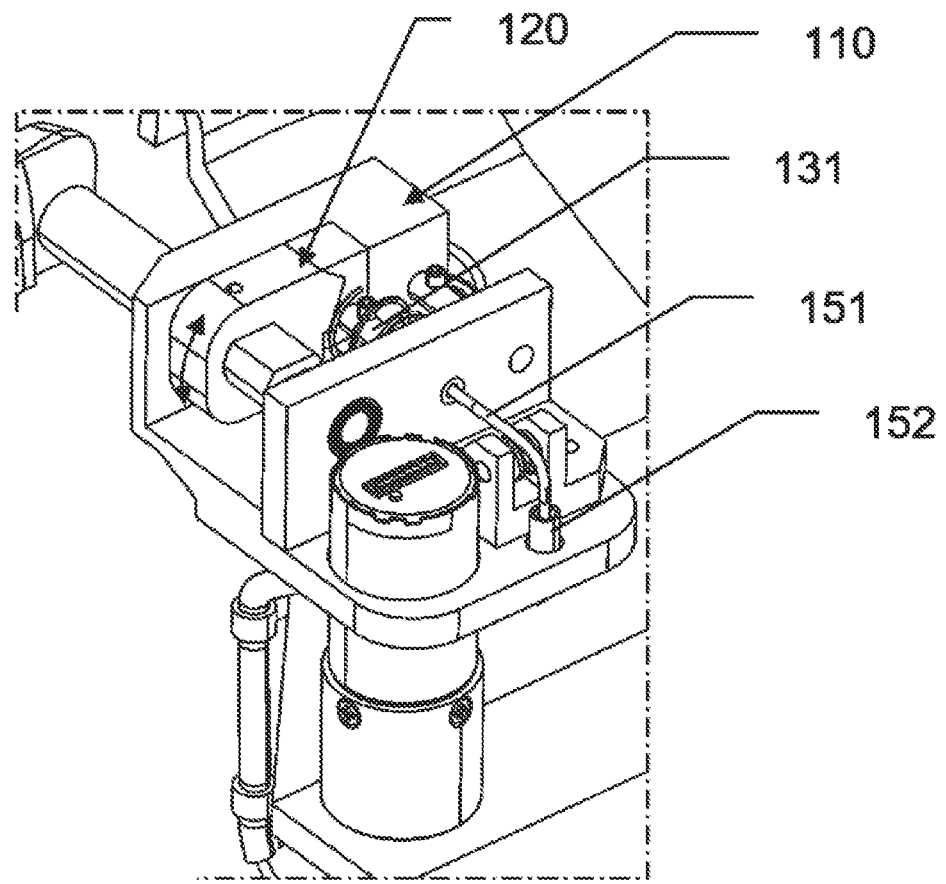

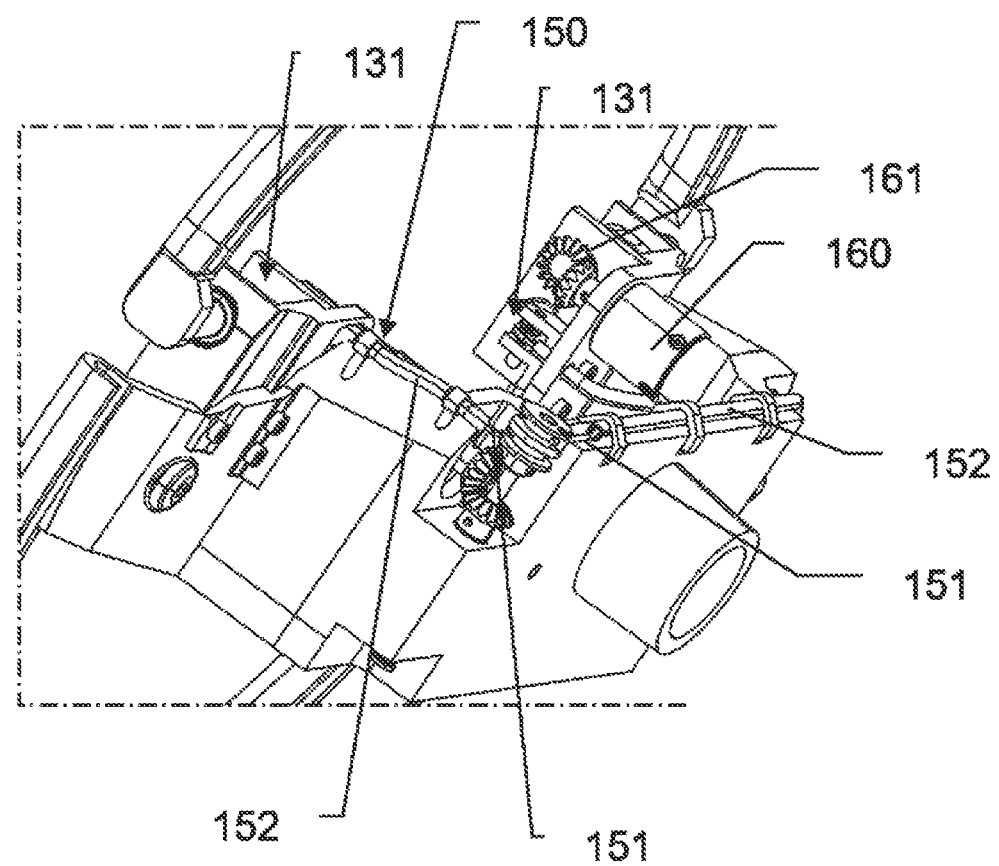
[Fig. 7]

VEHICLE STEERING WHEEL COMPRISING MECHANISMS AND A CONTROL ACTUATOR

TECHNICAL FIELD OF THE INVENTION

The present invention relates in general to a vehicle steering wheel with several mechanisms, such as hinge mechanisms for allowing movement of all or part of the rim relative to the hub.

STATE OF THE ART

Vehicle steering wheels are known in the prior art that provide hinge mechanisms to allow a movement of all or part of the rim relative to the hub. It may also be advantageous to provide an actuator for controlling the movement of the mobile part, and it is also possible to provide for locking the mobile part in a particular position. As a result, the number of actuators to control all these functions can be significant, which increases the complexity, cost and bulk. As regards the bulk, the space available in a steering wheel is limited and this can even lead to limiting the number of actuators and therefore of automated functions offered to the user.

DISCLOSURE OF THE INVENTION

One aim of the present invention is to address the disadvantages of the prior art mentioned above and in particular, first of all, to propose a vehicle steering wheel with mechanisms, for example hinge mechanisms to allow movement of all or part of the rim relative to the hub, and an actuator to automate functions such as locking/unlocking and/or movement of the movable part, while limiting the complexity, and/or cost and/or increasing the bulk.

For this a first aspect of the invention therefore relates to a vehicle steering wheel comprising:
- a base structure comprising a hub arranged to connect to a steering device of the vehicle,
- a mobile structure comprising at least one rim portion and articulated with respect to the base structure so as to be able to move between a first position, for example a driving position, and a second position, for example a retracted position,
- a first mechanism and a second mechanism each arranged between the base structure and the mobile structure,
- an actuator arranged so as to generate a movement for driving the first mechanism and the second mechanism,
- a transmission device arranged to transmit at least part of the driving movement to the first mechanism and the second mechanism, characterized in that the transmission device comprises at least one cable arranged so as to transmit at least part of the driving movement of the actuator to at least one of the first mechanism or the second mechanism.

A cable according to the above implementation makes it possible to distribute the driving movement of a single actuator to one of the first mechanism and/or the second mechanism. The costs are limited, such a cable has limited bulk, it can be shaped to bypass members of the steering wheel forming obstacles, and it provides the possibility of having only one actuator that controls two distinct mechanisms separated from one another.

In other words, the first mechanism can be a mechanism for driving and/or locking the mobile structure on the base structure In other words, the second mechanism can be a mechanism for driving and/or locking the mobile structure on the base structure According to one embodiment, the cable can be arranged between the first mechanism and the second mechanism. In other words, the cable starts from the first mechanism to go to the second mechanism.

According to one embodiment:
the actuator can be coupled to the first mechanism,
the second mechanism can comprise a locking unit arranged to reversibly lock the mobile structure in the first position on the base structure,
a first end of the cable can be connected to the first mechanism or to the actuator,
a second end of the cable can be connected to the locking unit of the second mechanism. According to this embodiment, the cable is connected to the locking unit of the second mechanism from the first mechanism. Preferably, the cable is connected only to the locking unit of the second mechanism, from the first mechanism, in order to control only the locking unit of the second mechanism.

According to one embodiment, the first mechanism may comprise a conversion device, with for example a cam device and/or a desynchronization mechanism, arranged to transform:
a first part of the driving movement into a locking/unlocking movement and
a second part of the driving movement into a displacement movement of the mobile structure. In other words, starting from the first position in the locked state, the first part of the driving movement is dedicated to unlocking the mobile structure, then the second part of the driving movement is dedicated to moving the mobile structure to bring it into the second position. Starting from the second position (unlocked), the actuator delivering the driving movement in the opposite direction will generate the second part of the driving movement to move the mobile structure from the second position to the first position, and will then generate the first part of the driving movement to lock the mobile structure onto the base structure.

According to one embodiment, only the first mechanism may comprise a conversion device, with for example a cam device and/or a desynchronization mechanism, arranged to transform:
a first part of the driving movement into a locking/unlocking movement and
a second part of the driving movement into a displacement movement of the mobile structure.

According to one embodiment, the second mechanism may not have a conversion device, having for example a cam device and/or a desynchronization mechanism, or a driving device, arranged to transform the second part of the driving movement into movement of displacement of the mobile structure. Consequently, the second mechanism only has a function of locking/unlocking the mobile structure on the base structure, and no function of driving/displacement of the mobile structure to move it between the first and second positions.

According to one embodiment, the first mechanism may comprise:
a locking unit arranged to reversibly lock the mobile structure in the first position onto the base structure,
a drive unit arranged between the actuator and the mobile structure for driving the mobile structure in displacement when the mobile structure is unlocked from the base structure. In other words, the steering wheel comprises two locking units (one on the side of the first mechanism and one on the side of the second mechanism), but a single drive unit (on the side of the first mechanism.

According to one embodiment:

during the first part of the driving movement, the cam device of the first mechanism can be arranged to engage the actuator with the locking unit of the first mechanism and disengage the actuator of the drive unit from the first mechanism, during the second part of the driving movement, the cam device of the first mechanism can be arranged to engage the actuator with the drive unit of the first mechanism.

According to one embodiment, the cam device may comprise:

a mobile input integral with the actuator comprising either an index finger or an opening, a mobile output integral with the mobile structure comprising the other of the index finger or the opening, and the index finger can be arranged in the opening with a clearance so as to be able to move in the opening during the first part of the driving movement without engaging the mobile input with the mobile output, and the index finger can be arranged to abut the opening so as to engage the mobile input with the mobile output during the second part of the driving movement. The clearance of the index finger in the opening makes it possible to sequentially engage the locking unit and then the drive unit of the first mechanism. Consequently, the two functions (the locking/unlocking function and the displacement function) are carried out sequentially.

According to one embodiment, the vehicle steering wheel may comprise a stroke-multiplying device arranged between the actuator and said one of the first mechanism or the second mechanism, connected to the actuator by said at least one cable. Such a multiplier device ensures that the locking/unlocking function will be completed at the second mechanism before the first mechanism. It is advantageously possible to provide this stroke-multiplying device between the first mechanism and the second mechanism, when the cable itself is arranged between the first mechanism and the second mechanism. This is particularly useful if the first mechanism ensures the locking/unlocking functions and displacement function in order to ensure that the displacement function will not be implemented before unlocking the second mechanism.

According to one embodiment, the stroke-multiplying device can be arranged to generate a locking/unlocking stroke on the side of the second mechanism greater than a locking/unlocking stroke on the side of the first mechanism.

According to one embodiment, the stroke-multiplying device may comprise:

a first rotary mobile input unit on the side of the first mechanism defining a first anchoring radius of the cable on the first rotary mobile input unit, a second rotary mobile input unit on the side of the second mechanism defining a second anchoring radius of the cable on the second rotary mobile input unit, wherein the first anchoring radius can be greater than the second anchoring radius.

According to one embodiment, the vehicle steering wheel may comprise a sheath, preferably fixed relative to the base structure, and receiving said at least one cable.

According to one embodiment, the cable can slide in the sheath. According to one embodiment, the sheath has two ends, each attached to the base structure so as to allow a reciprocating movement to the cable to impose a reciprocating movement to the mobile structure.

According to one embodiment, the sheath is integral and/or fixed and/or attached to the base structure. In other words, the sheath is not arranged on the mobile structure. This simplifies the overall structure of the steering wheel.

According to one embodiment, the actuator, the first mechanism, the cable and the second mechanism can be connected in series to one another. It can then be considered that the first mechanism can form a master mechanism, controlling the second mechanism which can form a slave mechanism via the cable. Consequently, the second mechanism can only be controlled if the first mechanism is controlled (by the actuator). Such an implementation makes it possible to give greater freedom of design since there is no dual structure (as could be the case with a parallel architecture) and more space is available.

According to one embodiment, the actuator can be a motor, such as an electric motor.

According to one embodiment, the second mechanism can be connected to the actuator via the cable in parallel with the first mechanism.

According to one embodiment, the cable, in particular an outlet end of the cable, can control (at the outlet) a sliding member.

According to one embodiment, the cable, in particular an outlet end of the cable, can control (at the outlet) a rotary member, preferably in the same direction of rotation as a direction of rotation of a rotary input control member of the cable.

According to one embodiment, the cable may have a round or flat cross-section, and may preferably be composed of several strands, for example more than 5 strands, typically 7 strands. The use of multi-strand cable makes it possible to reduce the radii of curvature and therefore to be integrated more easily into the environment of the steering wheel.

According to one embodiment, the actuator can be an electric motor or an electric gear motor.

According to one embodiment, the vehicle steering wheel may comprise a single actuator for controlling the first mechanism and the second mechanism.

According to one embodiment, the first mechanism and the second mechanism can each be arranged on either side of the hub.

According to one embodiment, the first mechanism and the second mechanism may each comprise a connection unit, such as for example a pivot connection defining an axis of rotation of the mobile structure relative to the base structure.

According to one embodiment, the mobile structure can comprise the entire rim and at least one arm part connecting the rim to the hub.

According to one embodiment, the base structure may comprise one rim portion and the mobile structure may comprise another portion of the rim.

According to one embodiment, the base structure may comprise the hub (typically with a central plate that receives an airbag and or a horn) and at the periphery of this hub, it is possible to provide an arm attachment part (typically arm-anchoring or protuberances) on which the arms of the mobile structure can be connected.

According to one embodiment, the first mechanism and the second mechanism may be hinge and/or transmission mechanisms between the base structure and the mobile structure. According to one embodiment, the first mechanism and the second mechanism may be hinge and/or transmission mechanisms between the hub and the arms. According to one embodiment, the first mechanism and the second mechanism can be hinge and/or transmission mechanisms between the connection parts of the arm at the periphery of the hub and/or of its central plate (typically arm anchoring bases or protuberances) and the arms of the mobile structure.

According to one embodiment, the central plate does not support any member of the first mechanism, nor of the second mechanism. In other words, the first mechanism and the second mechanism are arranged between the central plate and the mobile structure. Thus, there is more room for arranging an airbag on the central plate. According to one embodiment, the central plate can support part of the sheath.

According to one embodiment, the first mechanism and/or the second mechanism may each comprise at least one return spring arranged to return the mobile structure from the first position to the second position, or from the second position to the first position, preferably from the second position to the first position. Such automatic return can assist the return in one of the positions in order to increase operating safety, even in the event of failure of the actuator. The return spring can also contribute to taking up manufacturing slack, limiting/eliminating vibrations and pinging by exerting a force always directed in the same direction on the mobile structure.

According to one embodiment, said at least one return spring can be arranged between the base structure and the mobile structure. In other words, said at least one return spring may comprise a first end engaged on the base structure and a second end engaged on the mobile structure. The return spring can be a leaf spring, a coil spring, a clothespin type spring, etc.

DESCRIPTION OF THE FIGURES

Other features and advantages of the present invention will become more apparent upon reading the detailed description of two embodiments of the invention, which are provided by way of example but in no way limiting, and shown by the attached drawings, wherein:

FIG. 1 shows a front view of a vehicle steering wheel according to a first embodiment comprising a hub with a plate, a rim, arms connecting the rim to the hub;

FIG. 2 shows a detail in perspective of the plate of the hub of FIG. 1, which carries two mechanisms;

FIG. 3 shows a perspective view of the detail of FIG. 2 according to another point of view, with one of the mechanisms partially hidden;

FIG. 4 shows another perspective view of the detail of FIG. 2;

FIG. 5 shows a perspective view of a vehicle steering wheel according to a second embodiment comprising a hub with a plate, a rim, arms connecting the rim to the hub;

FIG. 6 shows a detail of the vehicle steering wheel of FIG. 5;

FIG. 7 shows another detail of the vehicle steering wheel of FIG. 5.

DETAILED DESCRIPTION OF EMBODIMENT(S)

FIG. 1 shows a vehicle steering wheel comprising:
a hub 11 with a plate 12 forming a base structure 10,
a rim 21 with arms 22 forming a mobile structure 20,
a first mechanism 30 and a second mechanism 40, arranged between the base structure 10 and the mobile structure 20. It can be noted that the plate 12 is optional and/or could have any other geometric shapes.

The mobile structure 20 can be moved relative to the base structure 10. In the present example, the first mechanism 30 and the second mechanism 40 each comprise a pivot connection, so that the entire rim 21 can rotate relative to the base structure 10. However, other types of connection can be provided, such as slides or combined rotational and/or translational movements.

In the present example, the first mechanism 30 and the second mechanism 40 are attached to the plate 12 rigidly connected to the hub 11, and each comprise a central shaft (respectively 23 and 24) integral with the mobile structure and mounted as a pivot link on each mechanism via a hub.

The first mechanism 30 and the second mechanism 40 each also comprise two flanges, respectively 31, 32 and 41, 42, which sandwich the essential part of the moving parts of each mechanism. It can be noted that the first mechanism 30 and the second mechanism 40 are each arranged on either side of the hub 11, which provides good guidance of the mobile structure, with good resistance to deformations, with small overhang distances.

As shown in FIG. 2, the vehicle steering wheel comprises a motor 50 forming an actuator that generates a driving movement distributed to the first mechanism 30 and to the second mechanism 40 by a drive device. An electric motor and/or a geared motor can be provided.

In general, as shown in FIGS. 2 to 4, in the present example, the drive device comprises:
an input pinion 53, which is engaged with the first mechanism 30, and
a cable 51, housed in a sheath 52, which starts from the first mechanism 30 to drive the second mechanism 40. The cable 51 could just as well start from the input pinion 53, or even the motor 50. The cable may be a multi-strand metal cable, with one or more strands. It is possible to have an overmolding with a material with a low friction coefficient (PTFE) in order to limit the sliding forces in the sheath 52. The sheath 52 may be flexible or rigid.

However, it can be noted that a single motor 50 is sufficient to drive the first mechanism 30 and the second mechanism 40, thanks to the cable which is generally arranged between the motor 50 and at least one of the mechanisms 30 or 40. It can also be noted that the sheath 52 runs along a tortuous path to follow the members of the steering wheel while minimizing the overall bulk. Thus, the drive device with a cable makes it possible to limit the required bulk with a single motor 50 and a cable 51/sheath 52 assembly which runs as close as possible to the hub 11 and the plate 12.

In detail, the mobile structure 10 is movable between a first position (as in FIG. 1, a driving position wherein a user can grip the rim 11 to drive the vehicle), and a second position (not shown, for example retracted or so-called console), in order to place a computer on the rim 11, or to free space in the event of the vehicle being stopped or autonomous driving.

To this end, it is provided to block or lock the mobile structure 10 in the first position to guarantee operating safety. For this, a locking unit is provided in the first mechanism 30 and the second mechanism 40.

As regards the displacement of the mobile structure 20, only the first mechanism 30 is arranged to transform the driving movement of the motor 50 into displacement movement of the mobile structure 20.

In summary, it is provided to lock the mobile structure 20 onto the base structure 10 on both sides of the hub 11 with the first mechanism 30 and the second mechanism 40, while the movement of the mobile structure 20 is controlled only on the side of the first mechanism 30. This provides safety during driving (the rim 21 is doubly locked on the hub 11), and an economy of means (only the first mechanism 30 should be able to move the mobile structure 20.

In particular, the first mechanism 30, as shown in FIGS. 3 and 4, comprises:
- a drive gear 35 coupled in direct engagement with the input pinion 53
- an index finger 38 embedded on one of the lateral faces of the drive gear 35,
- a first mobile plate 37 comprising an opening wherein the index finger 38 is arranged with an angular clearance a1 (FIG. 4), and mounted freely rotatable with the drive gear 35 (the first mobile plate 37 can rotate relative to the drive gear 35),
- the central shaft 23 already mentioned above and integral in rotation with the first mobile plate 37,
- a first rocker 34, mounted pivotally on the flanges 31, 32 (visible only in FIG. 2), and constantly pushed back toward the drive gear 35 by an elastic tab 341 engaged with the flanges 31, 32,
- a first locking pin 33 mounted on the first rocker 34
- a return spring 39 engaged between the central shaft 23 and the drive gear 53.

As shown in FIG. 3, the drive gear 53 is partially toothed, and a cam track 36 is arranged at the periphery of the drive gear 53, opposite the rocker 34 in order to control it as will be explained below. In addition, the drive gear 53 comprises a recess which receives a first end 511 of the cable 51.

As regards the second mechanism 40, said mechanism is simpler because, as shown in FIGS. 2 and 4, it comprises:
- a mobile control 45,
- a second mobile plate 47 that is freely rotatable relative to the mobile control 45,
- a second rocker 44, mounted pivotally on the flanges 41, 42 (visible only in FIG. 2), and constantly pushed back toward the mobile control by an elastic tab 441 engaged with the flanges 41, 42,
- a second locking pin 43 mounted on the second rocker 44 the central shaft 24,
- a return spring 49 engaged between the central shaft 24 and the mobile control 45.

The mobile control 45 comprises a housing receiving the second end 512 of the cable 51, and a cam track 46 arranged on the periphery, opposite the second rocker 44. As can be seen in FIG. 3, the mounting of the cable 51 ensures that the drive gear 35 drives the mobile control 45 in the same direction of rotation. The spring 49 ensures that the second end 512 of the cable 51, provided with a bearing ball in this example, is always supported on the housing of the control mobile 45. This guarantees operation without play and makes it possible to compensate for manufacturing tolerances, in particular length, of the cable 51.

As indicated in FIG. 3, the first end 511 of the cable 51 is located at a first anchoring radius R1 of the axis of rotation of the drive gear 35, and as indicated in FIG. 4, the second end 512 of the cable 51 is located at a second anchoring radius R2 of the axis of rotation of the mobile control 45. The second anchoring radius R2 is less than the first anchoring radius R1, which provides a stroke-multiplying device that makes it possible to multiply the angular stroke of the mobile control 45 relative to the drive gear 35, as will be explained below. Of course, the cam track 46 is adjusted as a result of this stroke multiplier. Thus, when the steering wheel is equipped with a stroke-multiplying device, the cam tracks 36 and 46 are different.

According to this first embodiment, the steering wheel actuator, that is to say the motor 50, generates a driving movement for sequentially:
- controlling the locking,
- moving the mobile structure. To this end, a conversion device with a cam device and a desynchronization device is provided.

In detail, starting from the driving position wherein the mobile structure 20 is locked on the base structure 10 via the first locking pin 33 and the second locking pin 43:
- the motor 50 drives in rotation the input pinion 53 which in turn rotates the drive gear 35,
- therefore, the drive gear 35 causes, on the one hand, the first lever 34 to tilt via the cam track 36, and on the other hand the rotation of the mobile control 45 via the cable 51,
- the rotation of the mobile control 45 simultaneously causes the tilting of the second lever 44 via the cam track 46,
- thus, the first locking pin 33 and the second locking pin 43 move and unlock the mobile structure 20 from the base structure 10. The cam device therefore transforms the first part of the driving movement into the unlocking movement.

However, at this stage, due to the angular clearance a1 between the opening of the first mobile plate 37 and the index finger 38, no movement is transmitted to the first mobile plate 37. In addition, thanks to the stroke-multiplying device provided by the difference of the anchoring radii R1 and R2, the unlocking is faster on the side of the second mechanism 40 and therefore ends in a certain way before the driving of the first mobile plate 37. Thus, a first part of the driving movement of the motor 50 makes it possible to unlock the mobile structure 20.

Once the first rocker 34 has been completely pivoted to completely unlock the mobile structure 20 of the base structure 10, the index finger 38 having passed through the entire path of the angular clearance a1, it can abut on the first mobile plate 37 and drive it in rotation, which causes the central shaft 23 and therefore the mobile structure 20 to move to the second position thereof. The mobile structure is thus retracted or in the console position (the rim can be horizontal, for example in order to place a laptop computer thereon). Thus, a second part of the driving movement of the motor 50 makes it possible to move the mobile structure 20. In other words, the desynchronization device (the index finger 38 in the opening of the first mobile plate 37) makes it possible not to transform the first part of driving movement into displacement movement: the desynchronization device only transforms the second part of driving movement into displacement movement of the mobile structure 20.

To return to the first position, the motor 50 is driven in the other direction of rotation to pivot the input pinion 53 and the drive gear 35. Due to the springs 39 and 49, the mobile structure 20 is automatically returned to the first position, that is, on the side of the first mechanism 30, the first mobile plate 37 follows the index finger 38 during the angular stroke which corresponds to the second part of the driving movement. On the side of the second mechanism 40, the mobile control 45 is also returned in rotation by the spring 49 (tensioned by the mobile structure which comprises the central shaft 24).

Once this part of the stroke has been carried out, the mobile structure 20 has returned to the first position, and the locking can be carried out. Indeed, the motor 50 continues to rotate the drive gear 35, which means that the cam track 36 releases the first rocker 34 constantly pushed by the elastic tab 341 against the drive gear 35. Thus, the first locking pin 33 returns to the position that locks the mobile structure 20. On the side of the second mechanism 40, the mobile control 45 also rotates, which also releases the second rocker 44 constantly pushed by the elastic tab 441 against the mobile control 45. Thus, the second locking pin 43 also returns to the position that locks the mobile structure 20.

In this embodiment, the same actuator therefore makes it possible to control the locking and the displacement of the mobile structure. This function is permitted here by locking and drive units based on cam mechanisms and with angular clearances, but clutch mechanisms, pawl mechanisms, etc., can be envisaged.

FIG. 5 shows a second exemplary embodiment, wherein only portion of the rim is movable, and where locking is carried out by a dedicated actuator. As shown in FIG. 5, the vehicle steering wheel comprises:
- a base structure 110 with a hub 111, a plate 112, arms 113, a rim portion 114,
- a mobile structure 120 with another rim portion 121, arm parts 122,
- a locking actuator (a first motor 150),
- a drive device with two cables 151 (visible in FIGS. 6 and 7) and two sheaths 152, and a drive return device 153,
- two mechanisms 131 (only one visible in FIG. 6),
- a displacement actuator (a second motor 160),
- a displacement return device 161.

In this exemplary embodiment, the base structure 110 comprises a rim portion 114, and the mobile structure 120 comprises another rim portion 121, connected to the base structure 110 by pivot connections (the arm parts 122 are mounted in bearings of the base structure 110).

The mobile structure 120 is therefore movable between:
- a first position (FIG. 5) wherein it is locked onto the base structure 110, and
- a second position (not shown) wherein the other rim portion 121 is inclined relative to the rim portion 114 of the base structure 110.

Two mechanisms 131 (FIG. 6) are provided on either side of the plate 112, between the base structure 110 and the mobile structure 120, in order to lock it in the first position on the base structure 110. These two mechanisms 131 comprise a sliding lock (translationally movable relative to the base structure 110) which can enter an orifice of the mobile structure 120 in order to prevent any rotational movement of the mobile structure 120.

The first motor 150 is connected to each of the mechanisms 131 by cables 151 mounted in sheaths 152 which run along the plate 112 between the first motor 150 and each of the mechanisms 131.

As shown in FIG. 7, a drive return device 153 is coupled to the first motor 150 to drive via conical torque two pulleys each connected to one of the cables 151. Thus, the rotation of the first motor 150 causes the two cables 151 to slide in the sheaths 152, which causes the lock to slide from each mechanism 131.

Furthermore, still FIG. 7, it can be noted that the second motor 160, attached to the base structure 110, is coupled to a displacement return mechanism 161 (another conical torque) to be able to move the mobile structure 120.

In order to move the mobile structure from the first position of FIG. 5 or 7 to the second position, the first motor 150 must therefore first be actuated to displace the locks of the mechanisms 131 and to unlock the mobile structure 120 from the base structure 110.

Once unlocking has been carried out, the second motor 160 can be actuated to rotate the mobile structure 120 and thus tilt the other rim portion 121 relative to the rim portion 114 of the base structure 110.

In the opposite direction, in order to move the mobile structure from the second position to the first position of FIG. 5 or 7, the second motor 160 must be actuated to rotate the mobile structure 120. Once the mobile structure 120 is in the first position (the other rim portion 121 aligned with respect to the rim portion 114 of the base structure 110), the first motor 150 can be actuated to move the locks of the mechanisms 131 and to (re) lock the mobile structure 120 onto the base structure 110.

Thus, according to this embodiment, a single actuator can control two locking mechanisms, which limits the bulk of this locking function.

It can be noted that the first motor 150 could be in direct engagement with one of the locks in order to provide only one cable 151. However, the use of two cables 151 makes it possible to place the first motor 150 anywhere on the steering wheel.

INDUSTRIAL APPLICATION

A vehicle steering wheel according to the present invention, and its manufacture, are capable of industrial application.

It will be understood that various modifications and/or improvements which are obvious to a person skilled in the art may be made to the different embodiments of the invention described in the present description without departing from the scope of the invention.

In particular, it can be noted that the actuators can be placed integral with the mobile structure. It is also possible to provide motors with racks, return levers, ratchet clutches, etc., to dissociate the locking/unlocking function of the displacement function.

The structure of the steering wheel may be different with a hub with no plate, or a non-circular rim, for example oval or even U-shaped. It is possible to provide other relative movements between the mobile structure and the base structure (translations, sliding pivots, combined rotations, etc.).

As regards the elastic tabs of the rockers, it can be provided to permanently tension them during the driving movement, with for example a cam track on the drive gear or on the mobile control which accentuates the tension only during the stroke part where the locking is to be carried out.

The steering wheel is shown here without covering, but the frame shown may of course be overmolded with a covering.

The invention claimed is:

1. A vehicle steering wheel comprising:
    a base structure comprising a hub arranged to connect to a steering device of the vehicle,
    a mobile structure comprising at least one rim portion and configured to articulate with respect to the base structure so as to be able to hingedly move between a first position and a second position,
    a first mechanism and a second mechanism each arranged between the base structure and the mobile structure,
    an actuator arranged so as to generate a movement for driving both the first mechanism and the second mechanism, a transmission device arranged to transmit at least part of the driving movement to the first mechanism and the second mechanism, characterized in that the transmission device comprises at least one cable arranged so as to transmit at least part of the driving movement of the actuator to at least one of the first mechanism or the second mechanism.

2. The vehicle steering wheel according to claim 1, wherein the cable is arranged between the first mechanism and the second mechanism.

3. The vehicle steering wheel according to claim 1, wherein:

the actuator is coupled to the first mechanism, the second mechanism comprises a locking unit arranged to reversibly lock the mobile structure in the first position onto the base structure, a first end of the cable is connected to the first mechanism or to the actuator, a second end of the cable is connected to the locking unit of the second mechanism.

4. The vehicle steering wheel according to claim 1, wherein the first mechanism comprises a conversion device arranged to transform:

a first part of the driving movement into a locking/unlocking movement, and a second part of the driving movement into a displacement movement of the mobile structure.

5. The vehicle steering wheel according to claim 4, wherein only the first mechanism comprises the conversion device.

6. The vehicle steering wheel according to claim 1, wherein the first mechanism comprises:

a locking unit arranged to reversibly lock the mobile structure in the first position onto the base structure, a drive unit arranged between the actuator and the mobile structure for driving the mobile structure in displacement when the mobile structure is unlocked from the base structure.

7. The vehicle steering wheel according to claim 1, comprising a stroke-multiplier device arranged between the actuator and said one of the first mechanism or the second mechanism connected to the actuator by said at least one cable.

8. The vehicle steering wheel according to claim 7, wherein the stroke multiplier device comprises:

a first rotary mobile input unit on a side of the first mechanism defining a first anchoring radius of the cable on the first rotary mobile input unit, a second rotary mobile input unit on a side of the second mechanism defining a second anchoring radius of the cable on the second rotary mobile input unit, wherein the first anchoring radius is greater than the second anchoring radius.

9. The vehicle steering wheel according to claim 1, comprising a sheath fixed with respect to the base structure, and receiving said at least one cable.

10. The vehicle steering wheel according to claim 1, wherein the actuator, the first mechanism, the cable and the second mechanism are connected in series with one another.

11. The vehicle steering wheel according to claim 1, wherein the second mechanism is connected to the actuator via the cable in parallel with the first mechanism.

12. The vehicle steering wheel according to claim 1, wherein an output end of the cable controls a rotary member in the same direction of rotation as a direction of rotation of a rotary input control member of the cable.

13. The vehicle steering wheel according to claim 1, wherein the cable has a round or flat cross-section.

14. The vehicle steering wheel according to claim 1, wherein the actuator is an electric motor or an electric gear motor.

15. The vehicle steering wheel according to claim 1, wherein the first position is a driving position in which a driver can grip the rim portion, and wherein the second position is a retracted position in which the rim portion is retracted relative to the driving position to facilitate autonomous driving or the vehicle being stopped.

16. The vehicle steering wheel according to claim 15, wherein the mobile structure is configured to be tilted with respect to the base structure between the first position and the second position.

* * * * *